US008365285B2

(12) United States Patent
Bi et al.

(10) Patent No.: US 8,365,285 B2
(45) Date of Patent: Jan. 29, 2013

(54) METHOD AND SYSTEM FOR DELETING OR ISOLATING COMPUTER VIRUSES

(75) Inventors: Hongjiang Bi, Beijing (CN); Yuhong Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 881 days.

(21) Appl. No.: 12/182,550

(22) Filed: Jul. 30, 2008

(65) Prior Publication Data
US 2009/0038012 A1 Feb. 5, 2009

(30) Foreign Application Priority Data

Aug. 3, 2007 (CN) .......................... 2007 1 0119951

(51) Int. Cl.
G09F 21/00 (2006.01)

(52) U.S. Cl. .............................. 726/24; 726/22; 713/188
(58) Field of Classification Search .............. 726/22–25, 726/11; 713/187, 188, 165, 182; 711/163; 709/220, 224
See application file for complete search history.

(56) References Cited

U.S. PATENT DOCUMENTS

| 5,361,359 | A | * | 11/1994 | Tajalli et al. | 726/23 |
|---|---|---|---|---|---|
| 5,842,002 | A | * | 11/1998 | Schnurer et al. | 703/21 |
| 6,212,635 | B1 | * | 4/2001 | Reardon | 713/165 |
| 6,591,362 | B1 | * | 7/2003 | Li | 713/1 |
| 6,792,543 | B2 | * | 9/2004 | Pak et al. | 726/24 |
| 6,802,028 | B1 | * | 10/2004 | Ruff et al. | 714/38 |
| 6,842,861 | B1 | * | 1/2005 | Cox et al. | 713/188 |
| 6,965,928 | B1 | * | 11/2005 | Cox et al. | 709/220 |
| 7,062,553 | B2 | * | 6/2006 | Liang | 709/224 |
| 7,096,501 | B2 | * | 8/2006 | Kouznetsov et al. | 726/24 |
| 7,458,074 | B2 | * | 11/2008 | Dull et al. | 717/169 |
| 7,591,018 | B1 | * | 9/2009 | Lee | 726/24 |
| 7,640,434 | B2 | * | 12/2009 | Lee et al. | 713/182 |
| 7,716,727 | B2 | * | 5/2010 | Phillips et al. | 726/11 |
| 7,743,417 | B2 | * | 6/2010 | Williams | 726/24 |
| 7,769,991 | B2 | * | 8/2010 | Niemela | 713/1 |
| 7,784,098 | B1 | * | 8/2010 | Fan et al. | 726/25 |
| 7,845,005 | B2 | * | 11/2010 | Kelley et al. | 726/22 |
| 2005/0114411 | A1 | | 5/2005 | Childs et al. | |
| 2007/0113062 | A1 | | 5/2007 | Osburn et al. | |

FOREIGN PATENT DOCUMENTS

| CN | 1779594 A | 5/2006 |
|---|---|---|
| EP | 1022655 | 7/2000 |
| JP | 2214955 A | 8/1990 |
| JP | 5274120 A | 10/1993 |
| JP | 9319574 A | 12/1997 |
| JP | 2006-040115 A | 2/2006 |
| WO | WO-98/12636 | 3/1998 |
| WO | WO-2007/084950 | 7/2007 |

* cited by examiner

Primary Examiner — April Shan
(74) Attorney, Agent, or Firm — Dickstein Shapiro LLP

(57) ABSTRACT

The invention discloses a method and a system for deleting or isolating computer viruses. The method of deleting or isolating computer viruses comprises steps of: selecting a first operating system configured with a virus killing module from a plurality of operating systems in a computer, during the computer being in starting process; loading the first operating system; scanning, by the virus killing module, the storage area of at least one operating system of the plurality of operating systems, wherein the at least one operating system doesn't include the first operating system; and deleting or isolating virus found during scanning. According to the present invention, a problem that the basic operating system could not be started due to viruses may be solved, and thus the system stability is greatly improved.

13 Claims, 3 Drawing Sheets

METHOD AND SYSTEM FOR DELETING OR ISOLATING COMPUTER VIRUSES

BACKGROUND OF THE INVENTION

1. Field of Invention

The present invention relates to a computer field, particularly to a method and a system for deleting or isolating computer viruses.

2. Description of Prior Art

With an increasing development of a computer and a network, computer viruses become more and more harmful. Thus a strong anti-virus function is an important guarantee for enabling a personal computer system stable. Since current anti-virus software mostly run on a basic operating computer system (such as windows system), the vulnerability of the system itself may weaken the actual effect of these anti-virus software. By way of an exemplary example, anti-virus software based on Windows may be useless for some booting-type viruses, since the virus may work before an anti-virus engine runs, and even may close the anti-virus software. Furthermore, when Windows may restart repeatedly when it encounters attacks of a new-type virus such as a bow wave, a shock wave, which cause the anti-virus software can not upgrade to a newly virus rule library normally at all, and thus can not perform an effective anti-virus operation. Additionally, some viruses may contest system resource in an operating system (OS), which influences a normal operation of the anti-virus software.

Currently, there mainly are two virus checking and killing methods.

One of the methods is a Type12 partition virus checking and killing method based on Master Boot Record (MBR). In this method, another operating system (which is called as an auxiliary system, generally is WinPE) is deployed in a Type12 partition, and a starting process of the system is controlled by modifying MBR. When a MBR module detects a particular function key, it loads the auxiliary system in the Type12 partition directly. Then, a virus killing application is enabled in order to check and kill viruses in a basic operating system. The disadvantages of the scheme is that MBR is easy to be modified by a user (e.g. the user re-installs a basic operating system or installs a second operating system), so as to cause the function invalid; the Type12 partition may be easily deleted by the user, or data files in the Type12 partition may be obtained by mounting as one disk, thereby to cause a lower security and stability.

The other method is a one-key virus killing method based on Host Protect Area (HPA). In this method, the auxiliary operating system is deployed at the end of a PC hard disk, and the auxiliary operating system is protected in a HPA manner. The disadvantages of this scheme are that there is a hardware capability problem in HPA, and HPA may hide space at the end of the hard disk, which causes the user to consider that the space of the hard disk is reduced without rhyme or reason, thus the after service costs of PC manufactures will be increased; additionally, HPA has no file system which causes inconvenience to management and maintenance.

SUMMARY OF THE INVENTION

Accordingly, a method and a system for deleting or isolating computer viruses are provided by the present invention.

The method of deleting or isolating computer viruses comprises steps of: selecting a first operating system configured with a virus killing module from a plurality of operating systems in a computer, during the computer being in starting process; loading the first operating system; scanning, by the virus killing module, the storage area of at least one operating system of the plurality of operating systems, wherein the at least one operating system doesn't include the first operating system; and deleting or isolating virus found during scanning.

The virus killing module may be upgraded in a network upgrading mode. Alternatively, the virus killing module may be upgraded by using a memory storing a higher version of the virus killing module. Additionally, the virus killing module may be upgraded by automatically synchronizing another virus killing module in at least one of the plurality of operating systems other than the first operating system.

The selecting a first operating system configured with a virus killing module from a plurality of operating systems in a computer comprises: setting a selecting module in the computer; selecting, by the selecting module, a first operating system configured with a virus killing module from a plurality of operating systems in a computer. Further, the loading the first operating system comprises: selecting a button configured in the computer; and loading the first operating system via activating the button. Wherein, the first operating system is deployed in the type 12 block of the computer, and the selecting module is configured in the end of the hard disk of the computer. The selecting module is a dual-system module.

The system for deleting or isolating computer viruses comprises: a system selection module for selecting a first operating system configured with a virus killing module from a plurality of operating systems in a computer, during the computer being in starting process, and loading the first operating system; and a virus processing module for scanning, by the virus killing module in the first operating system, the storage area of at least one operating system of the plurality of operating systems, wherein the at least one operating system doesn't include the first operating system, and deleting or isolating virus found during scanning.

The virus processing module may be upgraded in a network upgrading mode, copying a higher version of the virus killing module stored in a memory, or automatically synchronizing another virus killing module in at least one of the plurality of operating systems other than the first operating system.

The operating system configured with the first virus killing module is selectively loaded by selecting a button configured in the computer; and loading the first operating system via activating the button. The first operating system is deployed in the type 12 block of the computer. The system selection module is configured in the end of the hard disk of the computer, wherein the system selection module is a dual-system module.

According to the present invention, a problem that the basic operating system could not be started due to viruses may be solved, and thus the system stability is greatly improved.

BRIEF DESCRIPTION OF THE DRAWINGS

A further understanding of the present invention is provided referring to the drawings herein which constitute part of the application. Exemplary embodiments and the description thereof are intended to explain the present invention, which should not be considered as an appropriate limitation to the present invention. In the figures.

DETAILED DESCRIPTION OF PREFERRED EMBODIMENTS

Figure 1:
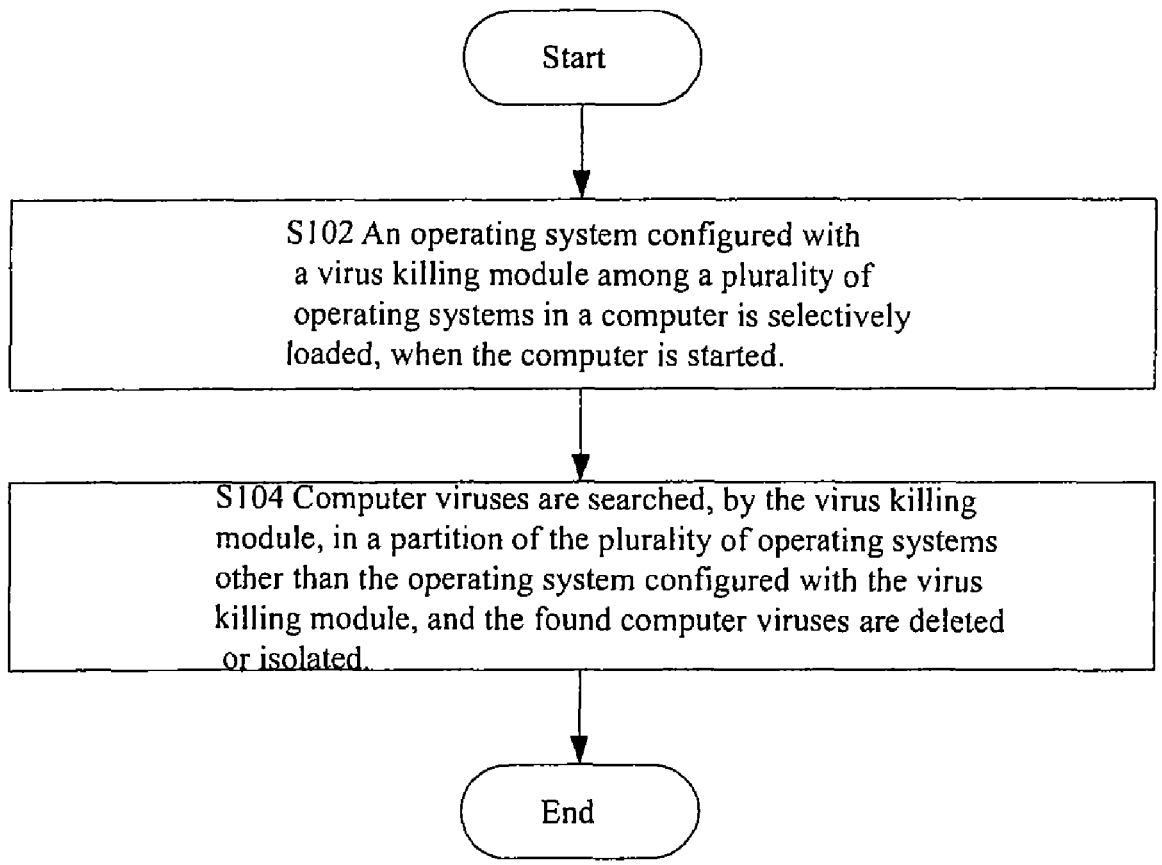
FIG. 1 is an illustrative diagram of a method of deleting or isolating computer viruses according to the present invention.

Hereinafter, the present invention will be further described in detail by referring to the drawings and the embodiments in order to make the objects, technical scheme and advantages of the present invention more apparent.

Referring to FIG. 1, FIG. 1 illustrates a method of deleting or isolating computer viruses according to the present invention. As shown in FIG. 1, the method comprises steps of: step S102 for selectively loading an operating system configured with a virus killing module of a plurality of operating systems in a computer, when the computer is started; and step S104 for searching for computer viruses, by the virus killing module, in a partition of the plurality of operating systems other than the operating system configured with the virus killing module, and deleting or isolating computer viruses which are found out.

The virus killing module may be upgraded in a network upgrading mode. Alternatively, the virus killing module may be upgraded by storing a higher version of the virus killing module. Additionally, the virus killing module may be upgraded by automatically synchronizing a virus killing module in at least one of the plurality of operating systems other than the operating system configured with the virus killing module.

Figure 2:
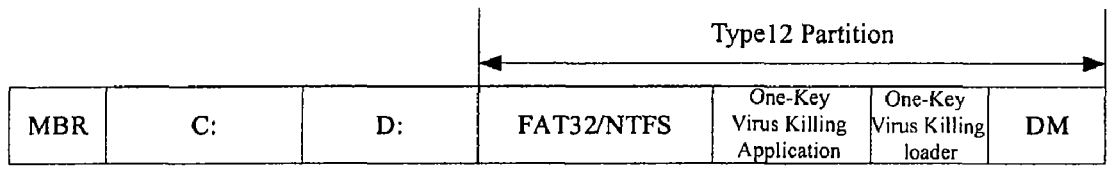
FIG. 2 is a layout schematic view of a computer disk including a plurality of operating systems.

The selection of the plurality of operating systems is implemented by setting an operating system selection module in the computer. Further, the operating system configured with the virus killing module is selectively loaded by operating a particular button on the computer. As shown in FIG. 2, the operating system configured with the virus killing module is deployed in a Type12 partition of the computer, and the operating system selection module is preset in the end of a hard disk in the computer. The operating system selection module may be a dual-system module.

Figure 3:
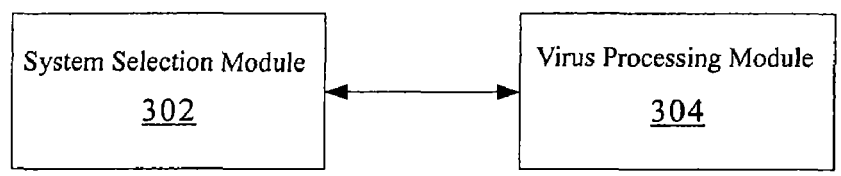
FIG. 3 is an illustrative diagram of a system for deleting or isolating computer viruses according to the present invention.
Figure 4:
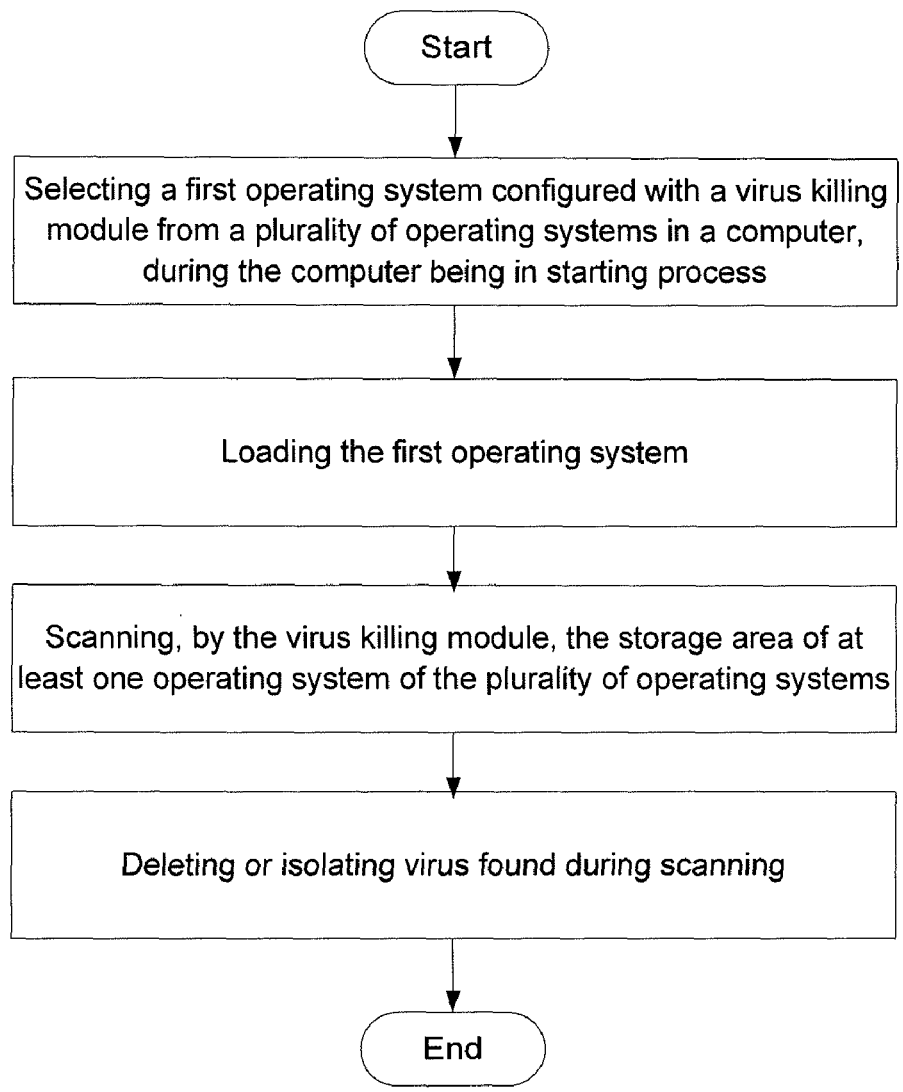
FIG. 4 is a flowchart illustrating an aspect of the present invention.

Referring to FIG. 3, FIG. 3 illustrates a system for deleting or isolating computer viruses according to the present invention. As shown in FIG. 3, the system comprises a system selection module 302 for selectively loading an operating system configured with a virus killing module of a plurality of operating systems in a computer, when the computer is started; and a virus processing module 304 for searching for computer viruses, by the virus killing module, in a partition of the plurality of operating systems other than the operating system configured with the virus killing module, and deleting or isolating computer viruses which are found out. FIG. 4 is a flow chart illustrating this process.

Figure 5:
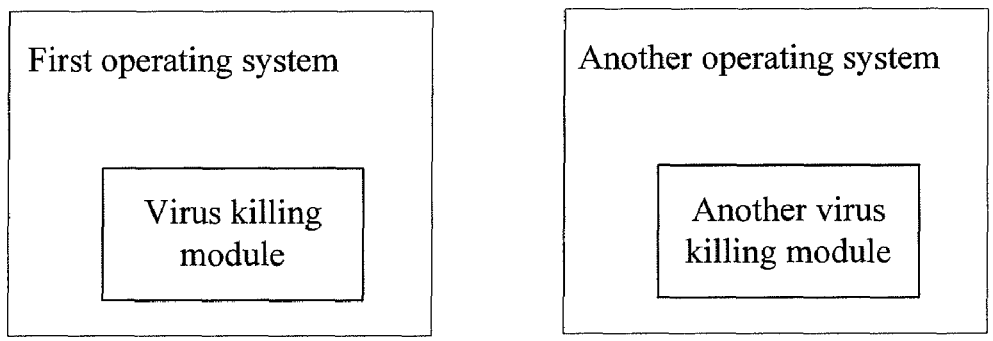
FIG. 5 is a diagram showing the relationship between virus killing modules and operating systems in accordance with an aspect of the present invention.

The virus processing module may be upgraded in a network upgrading mode, copying a higher version of the virus killing module stored in a memory, or automatically synchronizing a virus killing module in at least one of the plurality of operating systems other than the operating system configured with the virus killing module. FIG. 5 is a diagram of a first operating system with a virus killing module, and another operating system with another virus killing module.

The operating system configured with the virus killing module is selectively loaded by operating a particular button on a keyboard of the computer. The operating system configured with the virus killing module is located in a Type12 partition of the computer. The system selection module located in the end of a hard disk (as shown in FIG. 2) in the computer, wherein the system selection module may be a dual-system module.

In summary, the present invention provides a one-key virus killing scheme based on a Type12 partition. In this scheme, the virus killing module is deployed in the Type12 partition, and the one-key virus killing application is implemented by a Dual Module (DM) preset in the end of the hard disk. Therefore, modification and relying on a standard MBR may be prevented, and also the disadvantages of HPA may be preferably avoided.

Additionally, the one-key virus killing application according to the present invention may upgrade the virus library in various ways such as by automatically synchronizing virus libraries in the basic operating system, upgrading virus libraries via a network and via a USB mobile device, and may check and kill and isolate viruses in the basic operating system, thereby to improve the checking and killing effect.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A method of deleting or isolating computer viruses, the method comprising:
   selecting a first operating system configured with a virus killing module from a plurality of operating systems in a computer, during the computer being in starting process;
   loading the first operating system;
   scanning, by the virus killing module, the storage area of at least one operating system of the plurality of operating systems, wherein the at least one operating system doesn't include the first operating system; and
   deleting or isolating virus found during scanning,
   wherein the first operating system is deployed in a type 12 block of the computer, and wherein the selecting module is configured in the end of the hard disk of the computer.

2. The method of deleting or isolating computer viruses according to claim 1, wherein the virus killing module is upgraded in a network upgrading mode.

3. The method of deleting or isolating computer viruses according to claim 1, wherein the virus killing module is upgraded by using a memory storing a higher version of the virus killing module.

4. The method of deleting or isolating computer viruses according to claim 1, wherein the virus killing module is upgraded by automatically synchronizing another virus killing module in at least one of the plurality of operating systems other than the first operating system.

5. The method of deleting or isolating computer viruses according to claim 1, wherein the selecting a first operating system configured with a virus killing module from a plurality of operating systems in a computer comprising:
   setting a selecting module in the computer;
   selecting, by the selecting module, a first operating system configured with a virus killing module from a plurality of operating systems in a computer.

6. The method of deleting or isolating computer viruses according to claim 5, wherein the loading the first operating system comprising:
   selecting a button configured in the computer; and
   loading the first operating system via activating the button.

7. The method of deleting or isolating computer viruses according to claim 1, wherein the selecting module is a dual-system module.

8. A system for deleting or isolating computer viruses, which comprises at least one computer, the computer being configured to include:

a system selector that selects a first operating system configured with a virus killing module from a plurality of operating systems in a computer, during the computer being in starting process, and loading the first operating system; and a virus processor that scans, by the virus killing module in the first operating system, the storage area of at least one operating system of the plurality of operating systems, wherein the at least one operating system doesn't include the first operating system, and deleting or isolating virus found during scanning, wherein the first operating system is deployed in a type 12 block of the computer, and wherein the sector is configured in the end of the hard disk of the computer.

9. The system for deleting or isolating computer viruses according to claim 8, wherein the virus processor is upgraded in a network upgrading mode.

10. The system for deleting or isolating computer viruses according to claim 8, wherein the virus processor is upgraded by copying a higher version of the virus killing module stored in a memory.

11. The system for deleting or isolating computer viruses according to claim 8, wherein the virus processor is upgraded by automatically synchronizing another virus killing module in at least one of the plurality of operating systems other than the first operating system.

12. The system for deleting or isolating computer viruses according to claim 8, wherein the first operating system is selectively loaded by selecting a button configured in the computer; and loading the first operating system via activating the button.

13. The system for deleting or isolating computer viruses according to claim 8, wherein the system selector is a dual-system module.

* * * * *